(12) United States Patent
Luk et al.

(10) Patent No.: US 9,719,886 B2
(45) Date of Patent: Aug. 1, 2017

(54) TREAD WEAR ESTIMATION SYSTEM AND METHOD

(71) Applicant: The Goodyear Tire & Rubber Company, Akron, OH (US)

(72) Inventors: Yiu Wah Luk, Hudson, OH (US); Darshan Balkrishna Lotliker, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 43 days.

(21) Appl. No.: 14/804,597

(22) Filed: Jul. 21, 2015

(65) Prior Publication Data

US 2017/0023441 A1 Jan. 26, 2017

(51) Int. Cl.
*G01M 17/02* (2006.01)
*B60C 11/24* (2006.01)
*B60C 23/04* (2006.01)
*B60C 23/06* (2006.01)

(52) U.S. Cl.
CPC .......... *G01M 17/02* (2013.01); *B60C 11/243* (2013.01); *B60C 11/246* (2013.01); *B60C 23/04* (2013.01); *B60C 23/0408* (2013.01); *B60C 23/06* (2013.01)

(58) Field of Classification Search
CPC ...................................................... G01M 17/02
USPC ............................................................ 73/146
See application file for complete search history.

(56) References Cited

U.S. PATENT DOCUMENTS

| 5,249,460 A * | 10/1993 | Dory .................... G01M 17/027 356/431 |
| 5,303,756 A | 4/1994 | Hill |
| 5,721,374 A * | 2/1998 | Siekkinen ............. B60C 23/061 340/442 |
| 6,151,959 A | 11/2000 | Cantu et al. |
| 6,704,636 B2 * | 3/2004 | Amano ................... B60T 8/172 374/E7.042 |
| 6,802,213 B1 * | 10/2004 | Agrotis ................. B60C 23/061 73/146 |
| 6,941,800 B2 | 9/2005 | Shimura |
| 7,180,409 B2 | 2/2007 | Brey |
| 7,249,620 B2 | 7/2007 | Croissant et al. |
| 7,284,417 B2 | 10/2007 | Reynolds |
| 7,391,306 B2 | 6/2008 | Dufournier |
| 7,404,319 B2 | 7/2008 | Poulbot et al. |
| 7,604,029 B2 | 10/2009 | Myatt |
| 7,670,123 B2 | 3/2010 | Cuny et al. |

(Continued)

FOREIGN PATENT DOCUMENTS

| DE | 19745734 A1 | 4/1999 |
| EP | 1798071 A2 | 12/2006 |

(Continued)

OTHER PUBLICATIONS

EPO Search Report received by Applicant on Dec. 19, 2016.

*Primary Examiner* — Paul West
*Assistant Examiner* — Mark A Shabman
(74) *Attorney, Agent, or Firm* — Edward T. Kennedy (57) ABSTRACT

A tire wear state estimation system for a tire calculates tire effective radius during measured distance intervals travelled by the tire from vehicle speed and tire rotation counters. The system includes a filter for selecting slow-speed effective radius measuring intervals and an estimator for estimating the tire effective radius during only those intervals in which the vehicle is travelling below a threshold speed.

4 Claims, 7 Drawing Sheets

(56) References Cited

U.S. PATENT DOCUMENTS

| | | | |
|---|---|---|---|
| 8,061,191 B2 | 11/2011 | Hanatsuka | |
| 8,319,621 B2 * | 11/2012 | Kikuchi | B60C 23/04 340/438 |
| 8,493,200 B2 | 7/2013 | Wakao et al. | |
| 2002/0036567 A1 * | 3/2002 | Larson | B60C 23/061 340/442 |
| 2002/0157461 A1 * | 10/2002 | Schmidt | B60C 23/007 73/146 |
| 2003/0030553 A1 * | 2/2003 | Schofield | B60C 23/061 340/442 |
| 2008/0084285 A1 | 4/2008 | Bhogal | |
| 2015/0239298 A1 | 8/2015 | Kretschmann | |
| 2016/0033367 A1 | 2/2016 | Unterreiner et al. | |

FOREIGN PATENT DOCUMENTS

| | | |
|---|---|---|
| FR | 3006242 A1 | 12/2014 |
| JP | 1-307526 | 12/1989 |
| JP | 2005-028950 | 2/2005 |
| WO | 2014053322 A1 | 4/2014 |
| WO | WO2014195605 A1 | 12/2014 |

* cited by examiner

R_eff=Distance Travelled/(N_tire x 2 x pi)

where:
R_eff = Effective rolling radius of the tire.
N_tire = Number of revolutions of the tire for the Distance Travelled by the vehicle.
pi = Mathematical constant, 3.14159

FIG-7

TREAD WEAR ESTIMATION SYSTEM AND METHOD

FIELD OF THE INVENTION

The invention relates generally to tire monitoring systems for determining tire tread wear and, more particularly, to a system and method for estimating tire wear state based upon sensor measurements.

BACKGROUND OF THE INVENTION

Tire wear plays an important role in vehicle safety, reliability, and performance. Tread wear, referring to the loss of tread material, directly affects such vehicle factors. Tread wear may be monitored and measured through placement of wear sensors in the tire tread. Reliability of the direct wear measurement of tire tread, however, can be problematic due to issues such as sensor failure, difficulty in sensor integration into a tire tread and difficulty in retrieval of sensor data over the lifetime of a tire tread.

It is accordingly desirable to achieve a system and method that accurately and reliably measures tire wear state and communicates wear state to vehicle operators and/or to vehicle operating systems such as braking and stability control systems.

SUMMARY OF THE INVENTION

According to one aspect of the invention, a tire wear state estimation system for a tire supporting a vehicle includes a vehicle-based sensor for measuring multiple distance intervals travelled by the tire during vehicle operation at different vehicle speeds. A vehicle-based tire revolution counter makes a tire revolution count within each of the distance intervals and a vehicle-based speed sensor determines the vehicle ground speed during the distance intervals. A slow-speed interval selector selects one or more slow-speed distance interval(s) from the distance intervals based on the vehicle travelling at a ground speed less than a pre-selected threshold level. An effective radius estimator for estimates a slow-speed effective radius of the tire during the slow-speed distance interval(s) from the tire revolution count and the distance travelled by the tire during the slow-speed distance interval(s).

In another aspect, the tire wear-state estimator is operative to estimate the tire wear-state from a combined updated averaging of the estimated slow-speed effective radius estimations of the tire during the slow-speed distance intervals.

According to another aspect, a display is provided for communicating the estimated tire wear-state to an operator of the vehicle. The display may be vehicle-based and/or a handheld device connect to receive wireless communication of the estimated tire wear-state from the tire-wear state estimator.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between a measured signal and an estimated signal which the Kalman filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"PSD" is power spectral density (a technical name synonymous with FFT (fast fourier transform).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
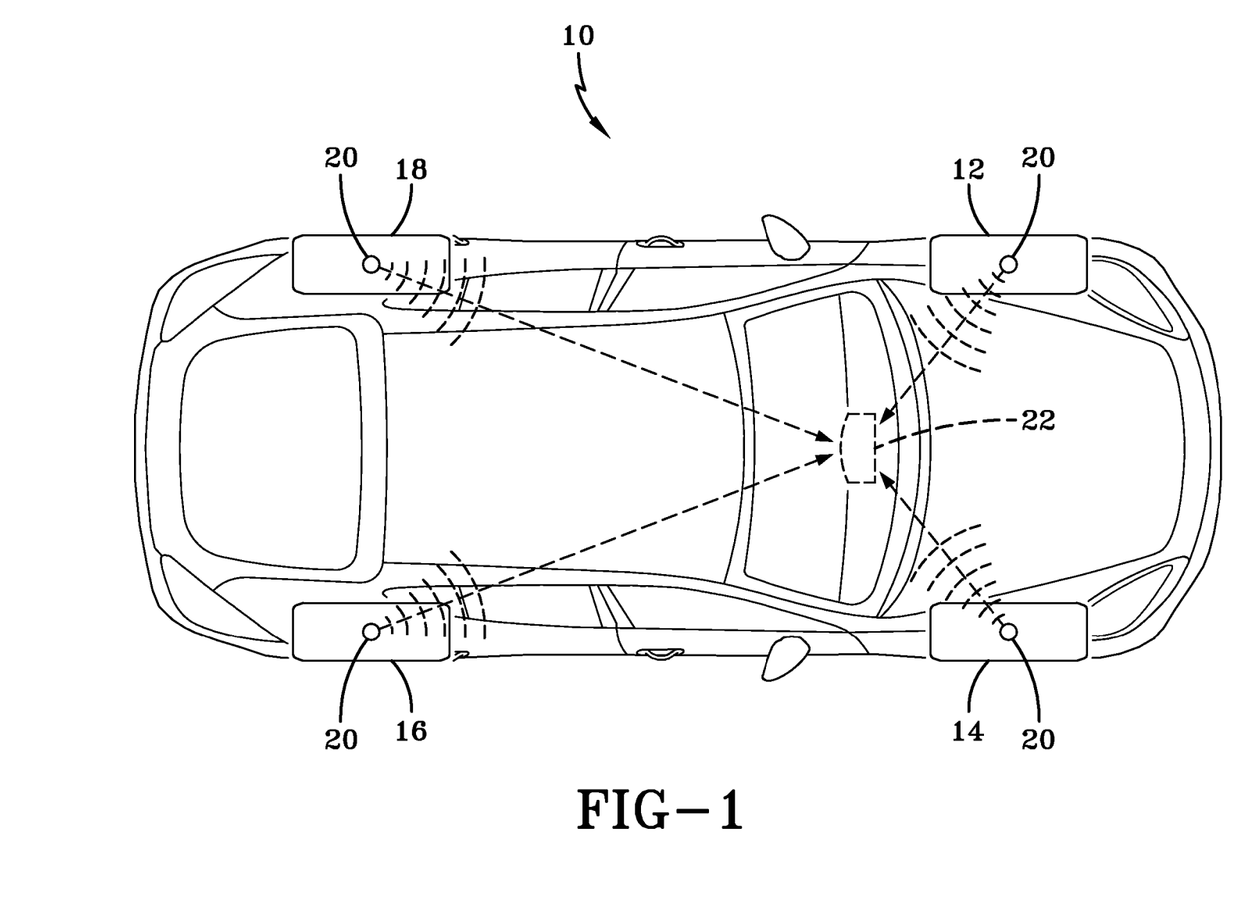
FIG. 1 is a diagram of the system showing a vehicle having wheels equipped with tire rotation sensors.
Figure 2A:
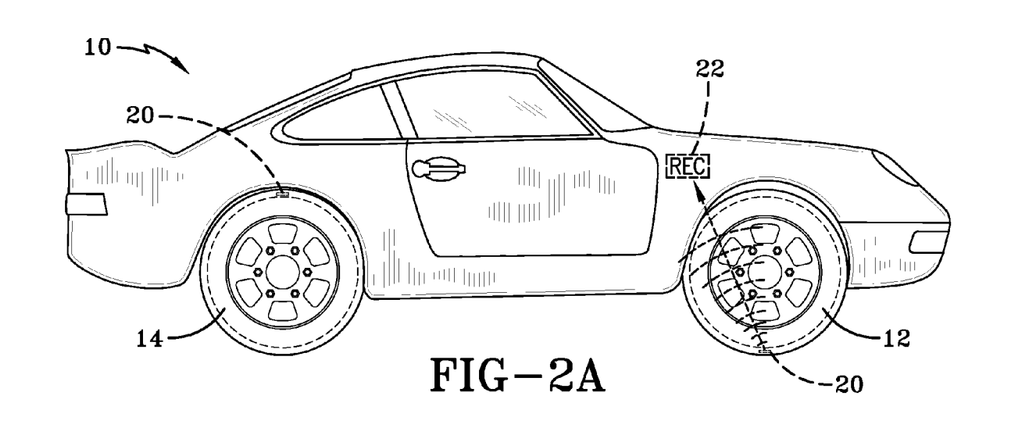
FIGS. 2A and 2B are diagrams of the vehicle showing transmission of front and rear tire rotation count information to an onboard processor as inputs into calculation of tire effective radius of the tires.
Figure 2B:
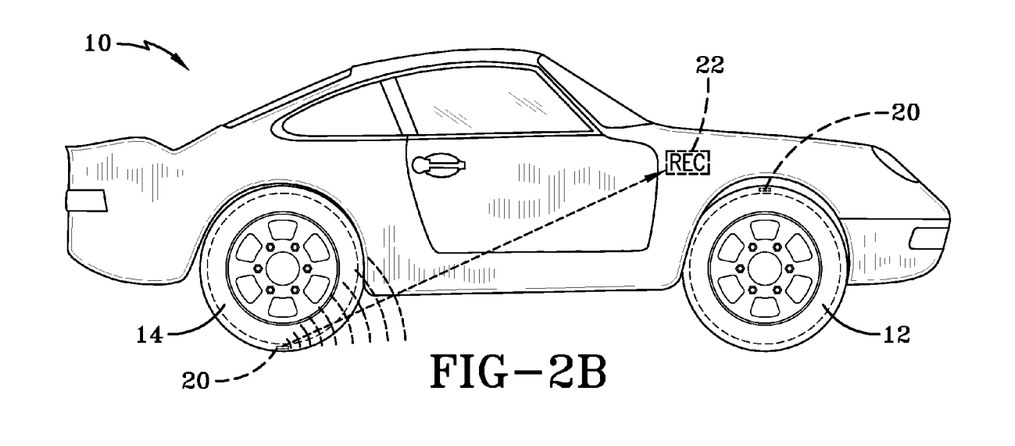

Referring to FIGS. 1 and 2, a tire wear estimation system is shown for estimating tread wear on each tire 12, 14, 16, 18 supporting vehicle 10. While vehicle 10 is depicted as a passenger car, the invention is not to be so restricted. The principles of the invention find application in other vehicle categories such as commercial trucks in which vehicles may be supported by more or fewer tires. The tires 12, 14, 16, 18 are of conventional construction having a circumferential tread that wears from road abrasion with age. Each tire is equipped with a sensor or transducer 20 mounted to the tire for the purpose of detecting tire rotation and producing a tire rotation count. The sensors 20 are of a type commercially available and may be affixed to the tire inner liner by suitable means such as adhesive. The sensors 20 operate to detect a rotation of the tire and transmit a signal to a receiver 22 for processing. The sensors 20 may be of any known configuration, such as piezoelectric sensors that detect a pressure differential in the sensor-mounting region of tire when the tire sensor-mounting region impacts a ground surface during tire rotation. Other alternative sensor types or configurations may also be used.

The sensors 20 transmit to receiver 22 a signal indicating a rotation of the tire has been completed. Alternatively, the sensor 20 may be programmed to transmit a signal when a preselected number of tire rotations have been completed. In addition to tire rotation count, the sensor 20 is provided with a tire identification (tire ID) code number that identifies the tire to which the sensor is attached. Thus, receiver 22 receives from each tire a tire rotation count signal and a tire ID code from which to identify and track each tire specifically. The tire ID transmission and receipt by receiver 22 is wireless, using transponder technology commercially available.

In FIGS. 2A and 2B, it is illustrated the manner in which the sensor 20 of each tire independently transmits a rotation count to receiver 22. Receiver 22 receives a signal from each tire sensor 20 at a predetermined mark, for example, when the sensor 20 (such as a piezoelectric sensor) is present within the tire contact footprint with the ground. The tire continues to rotate a full revolution, or a predetermined number of multiple revolutions, when a second signal is transmitted to the receiver 22. The time interval between the starting mark and the rotation conclusion signal is thus determined and conveyed as input to a signal processor (not shown). The signal processor may be vehicle-based, or at a remote location to the vehicle. As the tire rotates, a series of time intervals are detected by the receiver 22 as the vehicle rolls through its travel.

It will be appreciated and is explained further below, that the time intervals for a tire revolution changes depending on vehicle speed. During normal operation of the vehicle, some tire intervals will be longer than others. The signal processor, by determining the length of a tire rotation, can ascertain the speed of the vehicle during the time interval detected by sensor 20. The speed of the vehicle will thus be established for each detected tire rotation interval and may be analyzed as will be explained.

Figure 3:
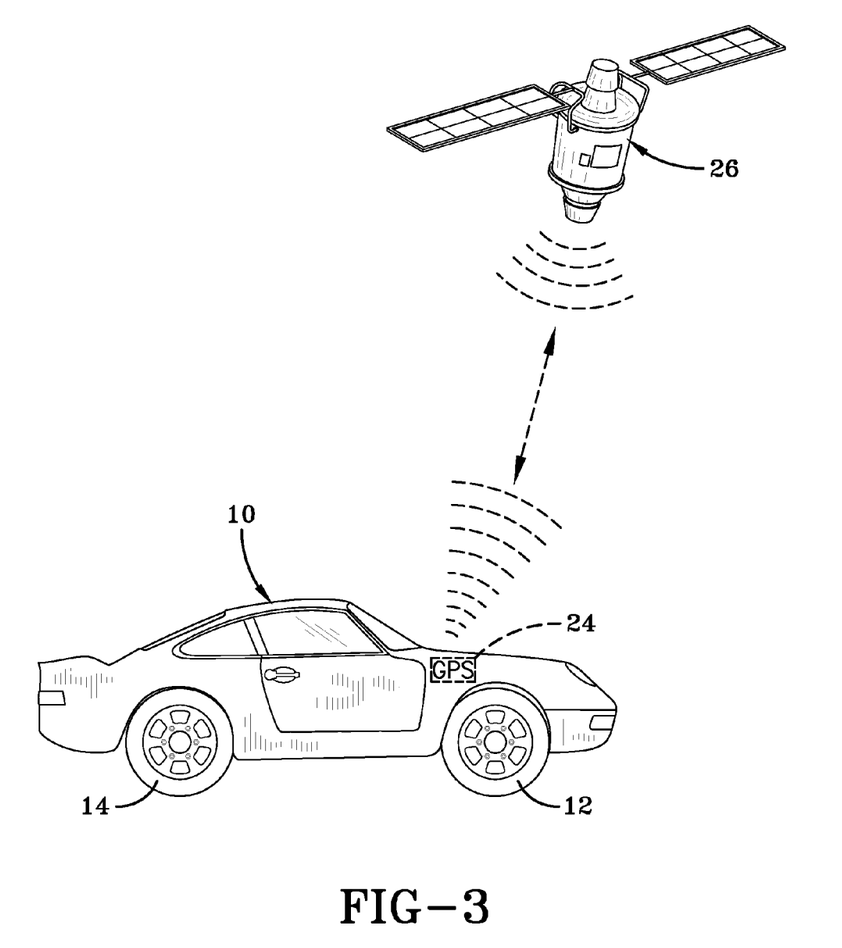
FIG. 3 is a diagram of the vehicle communicating through a satellite GPS system for obtaining distance travelled intervals of the vehicle.
Figure 4A:
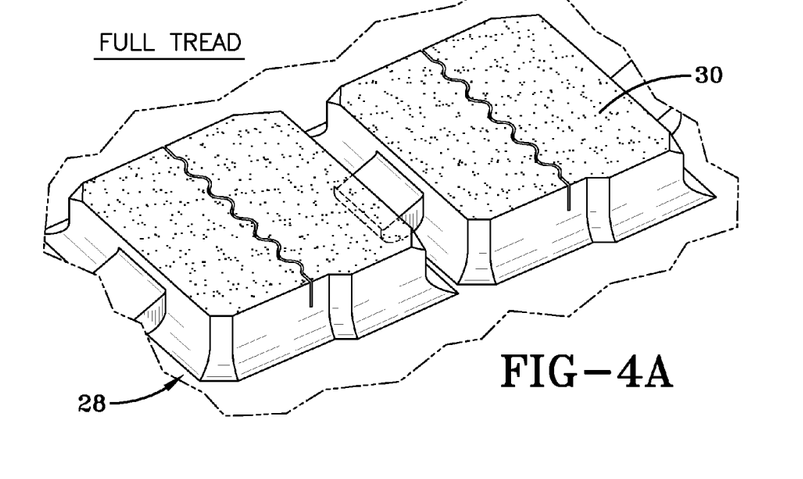
FIG. 4A is a diagram of a tire tread region in the unworn condition.
Figure 4B:
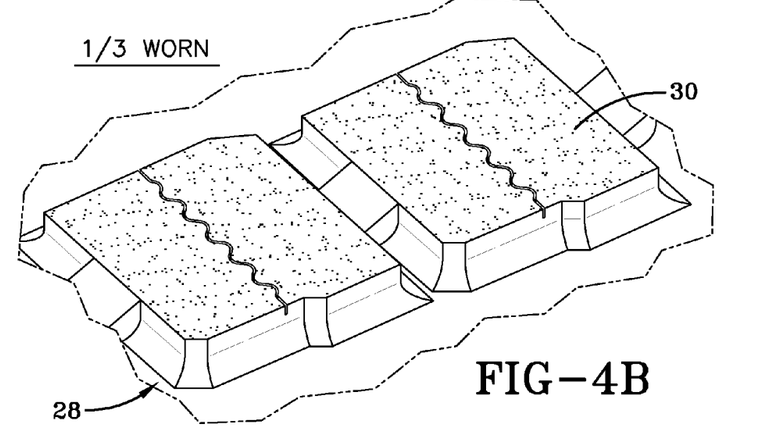
FIG. 4B is a diagram of the tire tread region in a partially worn condition.
Figure 4C:
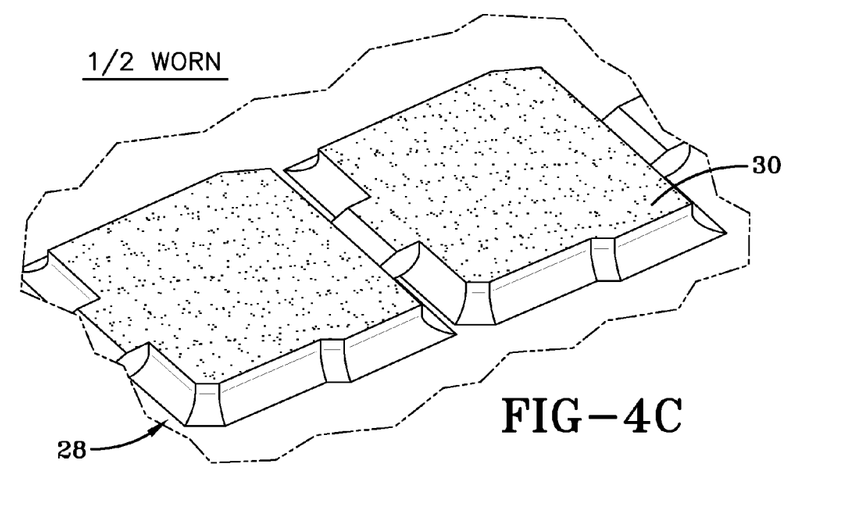
FIG. 4C is a diagram of the tire tread region in a half-worn condition.
Figure 4D:
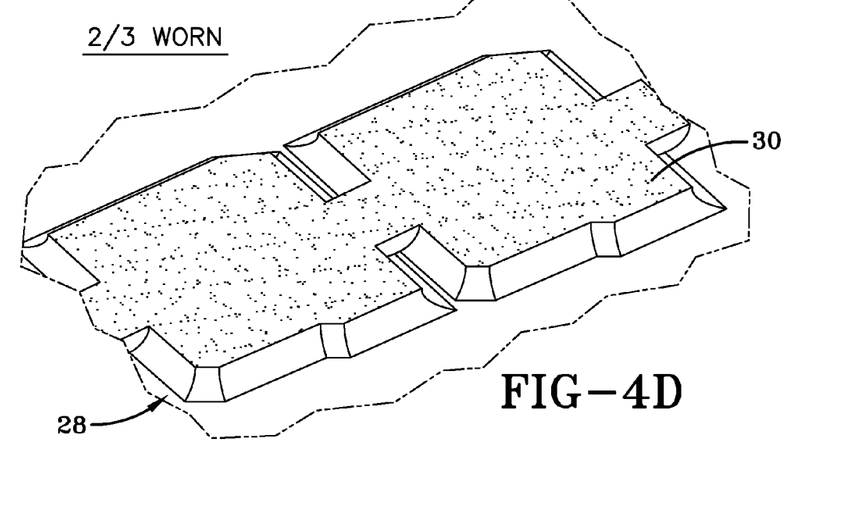
FIG. 4D is a diagram of the tire tread in a two-third worn condition.

In FIG. 3, the vehicle 10 is shown equipped with a GPS system 24 that is in communication with a satellite 26. The distance travelled by the vehicle during any given time interval may be determined from such a system. In the subject system, the GPS system is used to ascertain the distance the vehicle has travelled during a tire rotation time interval. The distance travelled by the vehicle for any given tire rotation time interval will depend on vehicle speed.

The subject invention system and method utilizes the relationship between tire wear and an effective rolling radius of a tire as the tire tread wears down through use. Pursuant to the invention, the effective rolling radius of a tire is calculated, preferably through the use of smartphone that is GPS capable in order to get an accurate measurement of the distance a vehicle has travelled during a sensor detected tire rotation interval. The smartphone may also be connected to the vehicle's computer via an OBD-II port and thus be capable of obtaining the tire's rpm through the use of standard vehicle-based sensors. While the use of smartphone is preferred, the invention is not so restricted and other computational signal processing devices may be implemented in the vehicle to achieve signal processing capability.

As a tire wears out, the effective rolling radius of the tire will become smaller. The subject system and method optimally measures the effective rolling radius and monitors tire wear through such measurement. By knowing the distance travelled by the vehicle (GPS) for a tire revolution (marked by vehicle or tire counter). FIGS. 4A through 4D show a tire tread region 28 having tire tread blocks 30. The wear condition of the tire tread blocks 30 is sequentially shown, progressing from a full tread to one-third worn to one-half worn to two-thirds worn depictions. As will be appreciated, the traction of the tread diminishes with wear, making a monitoring of the tread wear condition beneficial for the user of the tire.

The effective rolling radius (R_eff) increases with speed of the vehicle, with effective rolling radius at a higher speed being relatively larger than with the vehicle travelling at a lower speed. R_eff is higher at higher vehicle speeds because slip is introduced at the higher speed. Accordingly, the subject invention focuses on lower speed analysis of R_eff in the assessment of tire tread wear in order to eliminate the effect of slip on the analysis. As the vehicle travels through a typical driving cycle, it will be driven at higher and lower speeds. Sampling intervals based upon tire rotation count are identified. High vehicle speed intervals and relatively low vehicle speed intervals are separated electronically by the receiver signal processor throughout a driving cycle. By applying vehicle speed as a filter to the determination of R_eff, only the time intervals in which the vehicle is traveling at or below a preset threshold speed (i.e. low speed conditions) are used to determine R_eff. R_eff for the tire, used to indicate tread wear, is thus estimated more accurately through exclusive use of vehicle low speed interval analysis.

Figure 5:
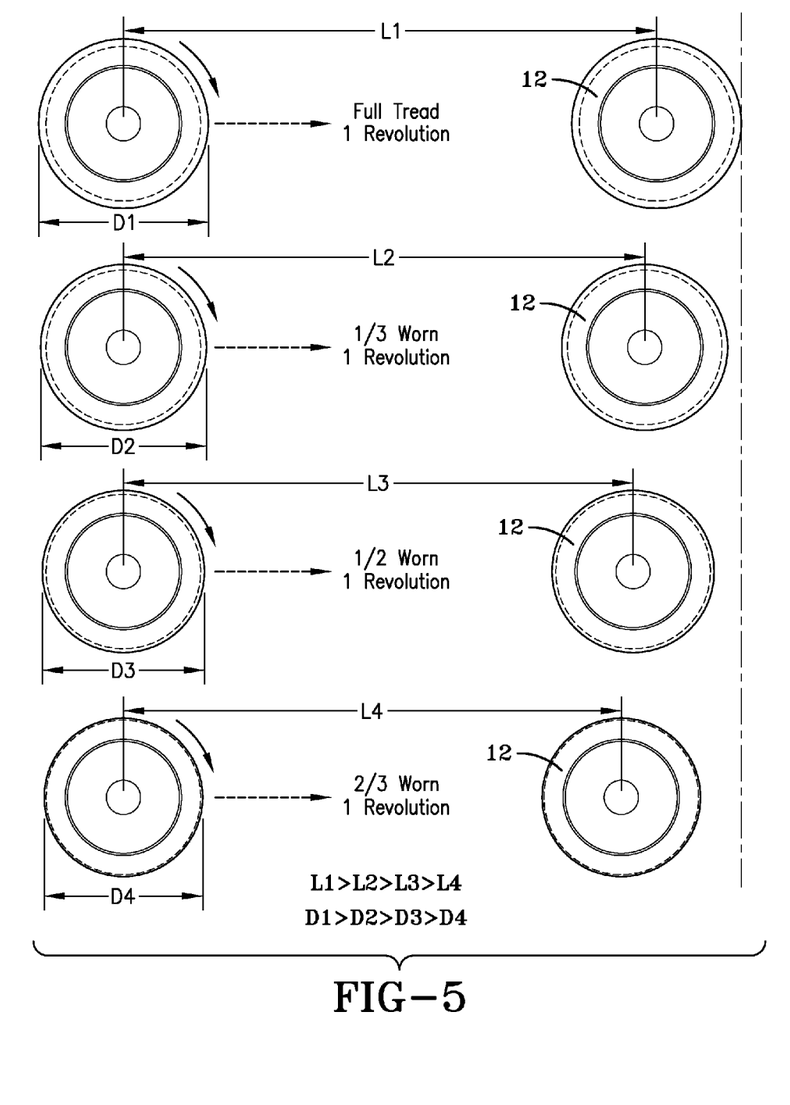
FIG. 5 is a diagram showing sequential wear of a tire throughout its useful life and the effect of wear on effective radius of the tire.

FIG. 5 shows a progression of the tire tread from full tread to two-third worn for tire 12. Distance travelled during one tire revolution, "L", changes as the tire tread becomes more worn and R_eff is reduced. The diameter "D" of the tire is seen to change (decrease) throughout the tire's wear life, causing the distance travelled per revolution of the tire to decrease. The wheel speed of a tire mounted to a vehicle may be obtained by interconnection with the OBD-II port for those vehicles so equipped. Access to wheel speed through the OBD-II port may be effected by a smartphone. The smartphone may track wear on each tire individually from its location on the vehicle or from a unique tire ID encoded on a tire-attached transponder. The transponder may wirelessly transmit tire ID codes to a receiver that can then track each tire's individual wear state. GPS is also typically built in to smartphones. Once the smartphone obtains wheel speed and distance travelled from its GPS, the following formula is solved for R_eff:

$$R\_eff = \text{Distance Travelled} / (N_{tire} * 2 * pi)$$

Figure 6:
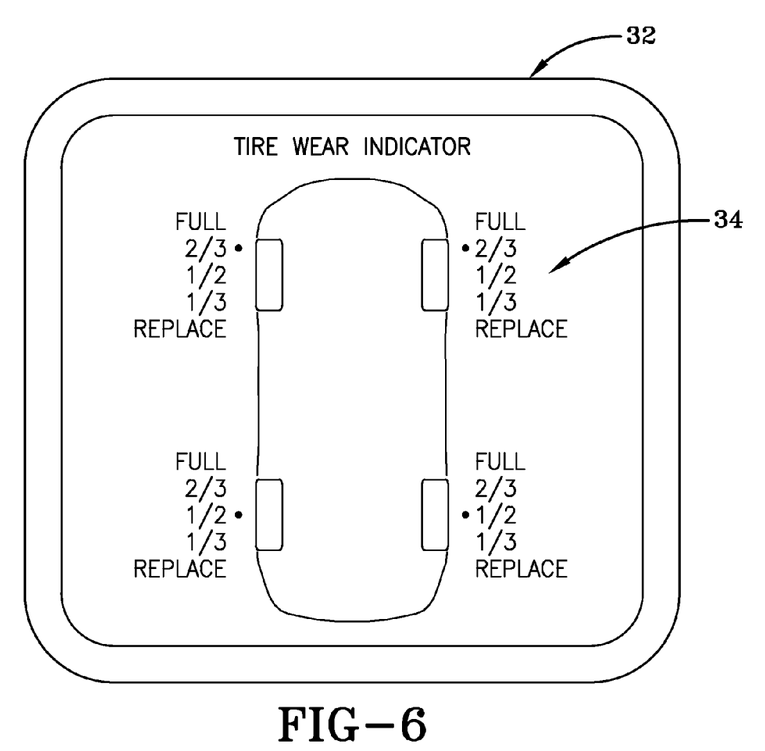
FIG. 6 is a diagram of a display showing wear condition of the vehicle's tires to an operator of the vehicle.
Figure 7:
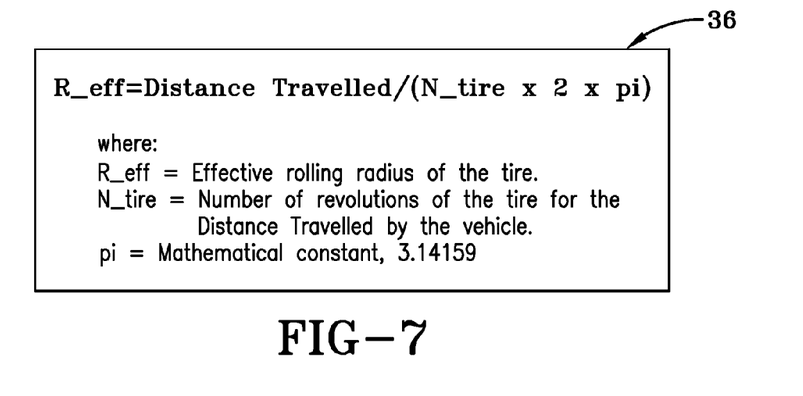
FIG. 7 is a summary of system algorithm for determining effective radius of a tire.

As shown at 36 of FIG. 7, Ntire is the number of tire revolutions obtained from the vehicle's data port. FIG. 6 shows one possible display 32 that may be used to communicate the results of tread wear to an operator of the vehicle. The tread wear indicator shows a diagram of the vehicle with each tire in its mounted location. For each tire, the tread wear is shown in step gradations 34 as full, two-thirds, one-half, one-third and "Replace". Visual indicators such as LED's are activated to indicate the corresponding wear state for each given tire.

As discussed previously, the smartphone may be programmed to sample the tires periodically to calculate R_eff and corresponding tread wear. Only those samplings where the vehicle is travelling below a preset threshold are preferably used in order to obtain a slow speed R_eff and tread wear.

From the foregoing, it will be appreciated that the subject invention provides a tire wear state estimation system for each tire supporting a vehicle includes a vehicle-based sensor (GPS) for measuring multiple distance intervals travelled by the tire during vehicle operation at different vehicle speeds. A vehicle-based tire revolution counter makes a tire revolution count within each of the distance intervals and a vehicle-based processor determines the vehicle ground speed during each of the distance intervals. A slow-speed interval selector selects one or more slow-speed distance interval(s) from the distance intervals based on the vehicle travelling at a ground speed less than a pre-selected threshold level. The determination of R_eff for each tire on the vehicle may be determined through an averaging of the R_eff computed for each tire from multiple slow-speed intervals by an averaging of the R_eff computed for the multiple intervals. An effective radius estimator for estimates a slow-speed effective radius R_eff of the tire during the slow-speed distance interval(s) from the tire revolution count and the distance travelled by the tire during the slow-speed distance interval(s).

The tire wear-state estimator is operative to estimate the tire wear-state from a combined updated averaging of the estimated slow-speed effective radius estimations of the tire during the slow-speed distance intervals.

A display is provided for communicating the estimated tire wear-state to an operator of the vehicle. The display may be vehicle-based and/or a handheld smartphone device connect to display the estimated tire wear-state of each tire from the tire-wear state estimator that calculates R_eff.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire wear state estimation system comprising:
    a tire supporting a vehicle;
    a vehicle-based sensor for measuring a plurality of distance intervals travelled by the tire during vehicle operation at different vehicle speeds;
    a vehicle-based tire revolution counter for counting a tire revolution count within each of the plurality of distance intervals;
    a vehicle-based speed sensor for determining the vehicle ground speed during the plurality of distance intervals travelled by the tire;
    a slow-speed interval selector operative to select at least one slow-speed distance interval from the plurality of distance intervals operatively based on the vehicle travelling at a ground speed less than a pre-selected threshold level;
    an effective radius estimator for estimating a slow-speed effective radius of the tire during the at least one slow-speed distance interval from the tire revolution count and the distance travelled by the tire during the at least one slow-speed distance interval; and
    a tire wear-state estimator operative to estimate a tire wear-state from the estimated slow-speed effective radius of the tire during the at least one slow-speed distance interval.

2. The tire wear state estimation system of claim 1, wherein the effective radius estimator is operative to estimate a slow-speed effective radius of the tire during a plurality of slow-speed distance intervals and the tire wear-state estimator is operative to estimate a tire wear-state from a combined averaging of the estimated slow-speed effective radius estimations of the tire during the plurality of slow-speed distance intervals.

3. The tire wear state estimation system of claim 2, further comprising a display for communicating the estimated tire wear-state to an operator of the vehicle.

4. The tire wear state estimation system of claim 3, wherein the display comprises a handheld device communicating the estimated tire wear-state from the tire-wear state estimator.

* * * * *